United States Patent Office 3,113,955
Patented Dec. 10, 1963

3,113,955
PROCESS FOR MAKING TETRAMETHYL LEAD
Charles A. Sandy, Clermont, Wilmington, Del., assignor to E. I. du Pont de Nemours and Company, Wilmington, Del., a corporation of Delaware
No Drawing. Filed Aug. 17, 1961, Ser. No. 131,993
10 Claims. (Cl. 260—437)

This invention relates to a process for the manufacture of tetramethyl lead, particularly by the reaction of a methyl halide with a sodium lead alloy in the presence of catalysts.

Tetraalkyl lead compounds are useful in fuels for internal combustion engines. Up until the present time, only tetraethyl lead has been manufactured and used predominantly. However, tetramethyl lead, with its higher volatility, can be used advantageously as an antiknock agent, alone or in combination with tetraethyl lead and the like in varying proportions, to improve the road performance of leaded fuels, as more fully described by Smyers et al. in U.S. Patent 2,310,376.

Calingaert et al., in U.S. Patent 2,270,109, disclose a process for preparing a mixture of tetramethyl and ethyl lead compounds by reacting a mixture of methyl chloride and ethyl chloride with sodium lead alloy in the presence of an aluminum type catalyst. In the mixture of five tetraalkyl lead compounds produced, tetramethyl lead is present in a minor proportion, and thus the process of Calingaert et al. is not economical for making pure tetramethyl lead.

The manufacture of tetramethyl lead by the general alkyl halide-sodium lead alloy reaction requires special conditions. Whereas the ethyl chloride-sodium lead alloy system does not require catalysis and can be accelerated by such substances as ketones, alcohols, acetals, etc. known in the art, the methyl chloride-lead alloy system responds not at all or poorly to the presence of such catalysts and to conditions otherwise conducive to the formation of tetraethyl lead. Methyl chloride is unique in that only certain catalysts of the aluminum type seem effective to bring about the formation of methylated lead compounds. Even so, the aluminum type catalysts present practical difficulties. For example, an induction period is generally encountered before the methylation begins, when using the combination of aluminum alloy and aluminum chloride described by Calingaert et al. in U.S. Patent 2,270,109 for the manufacture of mixed methyl and ethyl leads from mixtures of methyl and ethyl chlorides. Also relatively high tempertures (100° C.–110° C.) are required to achieve satisfactory yields of tetramethyl lead. The induction period and high reaction temperature together present the hazard of sudden and uncontrollable reaction (i.e. surges in temperature and pressure) once the exothermic methylation begins. This can be particularly serious with tetramethyl lead because of the relative ease with which it can decompose explosively.

Other aluminum type catalysts suggested by Calingaert et al., for example, trimethyl aluminum, dimethyl aluminum chloride, and the like, have the disadvantages for commercial use of being difficult and hazardous to handle because of their extreme sensitivity to air and moisture. On the other hand, it is desirable to be able to use aluminum and its alloys, which are commercially available and present no unusual storage and handling problems, provided the methylation can be initiated at relatively low temperatures without an appreciable induction period and provided also satisfactorily high yields of tetramethyl lead can be obtained.

It is an object of this invention to provide a new and improved process for the manufacture of tetramethyl lead. Another object is to provide a catalytic process for reacting a methyl halide with a sodium lead alloy wherein the reaction is initiated without an appreciable induction period and produces tetramethyl lead in good yield. A further object is to provide such a process for making tetramethyl lead which utilizes an aluminum type catalyst that is easy to handle, yet efficiently brings about the methylation of sodium lead alloy. Other objects are to advance the art. Still other objects will appear hereinafter.

The above and other objects may be accomplished in accord with this invention which involves the process for making tetramethyl lead which comprises initiating at a temperature of from about 50° C. to about 70° C. the reaction of a sodium lead alloy and an alkylating agent which consists of a methyl halide in which the halogen has an atomic number in the range of 17 to 53 in the presence of from about 0.05% to about 1% by weight of the sodium lead alloy of aluminum in the form of a member of the group consisting of aluminum metal and aluminum alloys which contain at least about 70% by weight of aluminum, and from about 0.3 to about 3 parts of elemental bromine per part of aluminum, then heating the reacting mixture to a temperature of from about 70° C. to about 130° C. and maintaining it at the latter temperature until the methylation reaction is substantially complete.

It has been found that by carrying out the reaction in such manner, material advantages and improved results are obtained. By having the elemental bromine present when the reaction mixture is subjected to reaction conditions, particularly to temperatures of from 50° C. to about 70° C., the reaction is initiated promptly, usually without an induction period. At times, a short induction period of at most 5–10 minutes is experienced at the lower initiation temperatures. However, the presence of the added bromine provides a smooth and safe initiation of the methylation reaction promptly at relatively low temperatures and ensures a smooth and controlled reaction. This is particularly important at the beginning when the mixture is heated to start the reaction. The yields of tetramethyl lead approach theoretical and thus it appears that the use of bromine along with aluminum in the process of the invention significantly increases the specificity of the methylation reaction at the expense of side reactions.

Usually, the over-all process comprises mixing the sodium lead alloy, the aluminum, the bromine, and the methyl halide at a temperature below about 50° C. (at which the methylation reaction does not readily take place), then heating the mixture with agitation to a temperature at which the reaction is initiated, and, when the reaction has become well started, gradually raising the temperature to where the reaction proceeds at a reasonable rate, completing the reaction at the higher temperature, and then recovering the tetramethyl lead from the reaction mixture by conventional procedures. For example, to recover the product, the charge is cooled, the residual methyl chloride vented to a recovery system (as in tetraethyl lead technology) and the tetramethyl lead component is recovered by solvent extraction (e.g. with toluene) or steam distillation.

The components of the reaction mixture may be mixed at the initiation temperatures, particularly at those in the lower range of initiation temperatures, since the reaction at first proceeds at a slow rate at the initiation temperatures. The components may be added to the reactor in any order, but, when mixed at the initiation temperature, preferably should be added simultaneously or the methyl chloride should be added last (after the other components have been added) with agitation.

Reaction temperatures range from 50° C. to about 130° C. and, for reasons of safety, the pressure is preferably kept below about 500 p.s.i.g., for example, by cooling, by controlling the rate of heating and/or the amount of methyl halide in the reaction zone, and by venting. In general, the rate of heating and the resulting pressure rise are coordinated to prevent sharp increases therein, the temperature being gradually raised to the desired level. The reaction temperature may be raised continuously or intermittently as desired from the temperature of mixing the ingredients through the reaction initiation stage to the temperature desired for rapid completion of the reaction. Temperatures of from about 90° C.–120° C. are preferred for completing the reaction.

The reaction requires one mole of methyl halide for each mole of sodium in the sodium lead alloy. The reaction may be initiated with all of the desired amount of methyl halide present or with a fraction of the required amount of methyl halide present, followed by gradual addition of the rest of the desired amount as the reaction proceeds.

The methylating agent may be one or more of the methyl halides in which the halogen has an atomic number in the range 17 to 53. Preferably, the reaction is conducted with methyl chloride and monosodium lead alloy, NaPb. The total amount of methyl halide is at least one mole and usually not more than 20 moles thereof per mole of sodium as sodium lead alloy, and preferably from about 1.1 to about 5 moles of methyl halide per mole of sodium. It is preferred to have all or at least about a mole of the methyl halide present in the reaction zone at the time the methylation is initiated. However, the methyl halide may be added gradually during the reaction, and, in this case, it is best to have at least about 0.25 to about 0.5 mole of methyl halide per mole of sodium present at the initiation of the reaction, and to gradually add the rest of the methyl halide after the reaction has been initiated. The larger amounts of the methyl halide can be used to dilute the reaction mass and aid in controlling the reaction temperature. Similarly, the methyl halide can be carried in an inert solvent, such as the hydrocarbons, hexane, benzene, toluene, and the like, to dilute the reaction mass.

The aluminum component can be aluminum metal or an alloy thereof in which aluminum is the major component and preferably amounts to about 70% or more of the alloy, most preferably at least about 85%. Other metals normally associated with aluminum in commercially available and suitable alloys are manganese, silicon, copper, magnesium, lead, iron, nickel, chromium, zinc and titanium.

The amount of aluminum component employed usually is from about 0.05% to about 1% by weight of the sodium lead alloy, preferably about 0.1% to about 0.6%. Preferably, it will be comminuted, in the form of small particles, e.g. as powder, chips, or shavings.

It is also preferred that the aluminum in such comminuted form be freshly prepared so as to expose freshcut metal surfaces to the action of the other ingredients in the starting reaction mixture. The metal is preferably reduced to the desired size under anhydrous and non-oxidizing conditions, i.e. under a dry inert gas such as nitrogen, methane, helium, and the like, and is also stored under such conditions until used in the methylation reaction. However, the metal may be cut in air and handled in ordinary atmosphere, if it is to be used soon after cutting. For example, in various related experiments aluminum alloy was cut in air and stored in a capped bottle under air for several days before using. Chips of the aluminum alloy were powdered by grinding in a mortar in ordinary atmosphere and then used immediately. Ordinary commercial aluminum foil was cut into strips and used as is. In each case, an active aluminum catalyst was produced, judging from the fact that the process was operable to produce tetramethyl lead.

Particle size is not critical. Good results have been obtained with metal turnings about an inch long, a half-inch wide and one-sixteenth of an inch thick, and as well with larger and much smaller shavings, and with powdered aluminum metal and alloys.

The amount of bromine added to the reactor corresponds to less than the stoichiometric quantity required to convert all the aluminum to $AlBr_3$, and ordinarily ranges from about 0.3 to 3 parts per part of the aluminum component, usually from about 0.8 to about 2 parts, with about 1 to 1 preferred.

It is usually desirable to effect the reaction in the presence of an inert solid such as graphite or silica as an internal lubricant, mixing aid, or anti-agglomerant for lead, since ordinarily the reaction mass tends to be somewhat difficult to stir, probably due to the inherent tendency of the particles of free lead to stick together. from about 1% to about 20% by weight based on the sodium lead alloy may be used, depending on the dimensions of the reactor, the effectiveness of the agitation means, and the proportions of the reactants.

In order to more clearly illustrate this invention, preferred methods for practicing it and the advantageous results to be obtained thereby, the following examples are given wherein the quantities and proportions are by weight unless otherwise specifically indicated.

*Example 1*

A steel bomb is charged under nitrogen to contain 2.5 parts of graphite, 0.62 part of the aluminum alloy described below, 100 parts of crushed monosodium lead alloy and 1.25 parts of liquid bromine. Then 77 parts of methyl chloride are added to the bomb cooled with solid carbon dioxide and the bomb closed. In this system, the total volume of the bomb is such that the amount of methyl chloride corresponds to 0.31 gram per cubic centimeter. After warming to room temperature, the bomb is heated over a period of 14 minutes to 110° C., held there for 1 hour, then cooled and opened. Tetramethyl lead is obtained in 81% yield on extraction of the reaction mass with isooctane.

If bromine is omitted in this example, the process is characterized by a rather lengthy and unpredictable induction period, about 30 minutes or longer, compared with at most 5–10 minutes in the presence of bromine.

The yield of tetramethyl lead is only 52% when aluminum chloride is used alone (0.62 part) in the above procedure instead of the aluminum-bromine combination.

When boron fluoride is used alone in the above procedure, no tetramethyl lead is obtained.

*Example 2*

A. A stainless steel pressure reactor is charged under nitrogen in the following order with 3.4 parts of flaked graphite, 0.21 part of fresh turnings of an aluminum alloy as identified below, and 100 parts of comminuted monosodium lead alloy at room temperature. It is then cooled in a solid $CO_2$-acetone bath to −78° C. and 0.17 part of liquid bromine added. The cooled reactor is closed, evacuated, and 90 parts of liquefied methyl chloride admitted. (The weight to volume ratio of the methyl chloride to the total capacity of the bomb corresponds to 0.21 gram/cc.) The reactor is heated under agitation to bring the reaction mass to a temperature of 110° C. in 25 minutes. It is held at 110° C. for 90 minutes, and then is cooled and opened. Tetramethyl lead is obtained from the reaction mass, by extraction with toluene, in 99.5% yield.

B. Repeating this procedure A with twice the above amount of bromine, results in 96% yield of tetramethyl lead.

C. On repeating procedure A, but shortening the reaction time to 60 minutes at 110° C., tetramethyl lead is obtained in yields of at least 90% of theoretical.

In comparison, the following results are obtained on repeating Example 2 with an equal weight of iodine or aluminum chloride in place of bromine: With $I_2$ in 2A and 2B, the yield is about 2% less than with $Br_2$; with AlCl₃ in 2A, the yield is 92%. With AlCl₃ as the sole catalyst (0.62 part) the yield is 90%. Similarly inferior results are obtained with AlBr₃ (e.g. 1.3 parts) as the catalyst.

The aluminum alloy used in the above examples was "Alcoa" No. 113 (of the Aluminum Company of America) of the following percent composition: Cu 6.0–8.0, Fe 1.4, Si 1.0–3.0, Mn 0.1, Mg 0.07, Zn 2.2, Ni 0.3, Ti 0.2, other elements 0.5, the remainder Al. Also, there may be used other commercially available aluminum alloys composed of at least about 70% aluminum alloyed with one or more of the above metals in varying proportions. Also, good results are obtained with pure aluminum metal.

It will be understood that the preceding examples have been given for illustrative purposes solely and that this invention is not restricted to the specific embodiments described therein. On the other hand, it will be readily apparent to those skilled in the art that, subject to the limitations set forth in the general description, many variations can be made in the materials, proportions, conditions and techniques employed without departing from the spirt or scope of this invention.

From the preceding description and examples, it will be apparent that this invention provides a new and improved process for making tetramethyl lead in high yields which process overcomes the difficulties and hazards involved in the prior processes. Particularly, this invention eliminates the induction period ordinarily encountered in prior processes and the hazards involved therein, and permits the initiation of the reaction at lower temperatures in a smooth and safe manner and the reaction to be readily controlled. It produces tetramethyl lead as the predominant product and makes it possible to safely and economically produce pure or substantially pure tetramethyl lead in high yields. Accordingly, it will be apparent that this invention constitutes a valuable advance in and contribution to the art.

The embodiments of the invention in which an exclusive property or privilege is claimed are defined as follows:

1. The process for making tetramethyl lead which comprises initiating at a temperature of from about 50° C. to about 70° C. the reaction of a sodium lead alloy and an alkylating agent which consists of a methyl halide in which the halogen has an atomic number in the range of 17 to 53 in the presence of from about 0.05% to about 1% by weight of the sodium lead alloy of aluminum in the form of a member of the group consisting of aluminum metal and aluminum alloys which contain at least about 70% by weight of aluminum, and from about 0.3 to about 3 parts of elemental bromine per part of aluminum, then heating the reacting mixture to a temperature of from about 70° C. to about 130° C. and maintaining the mixture at the latter temperature until the methylation reaction is substantially complete.

2. The process for making tetramethyl lead which comprises initiating at a temperature of from about 50° C. to about 70° C. the reaction of a sodium lead alloy and an alkylating agent which consists of a methyl halide in which the halogen has an atomic number in the range of 17 to 53 in the presence of from about 0.05% to about 1% by weight of the sodium lead alloy of aluminum in the form of an aluminum alloy which contains at least about 70% by weight of aluminum, and from about 0.3 to about 3 parts of elemental bromine per part of aluminum, then heating the reacting mixture to a temperature of from about 70° C. to about 130° C. and maintaining the mixture at the latter temperature until the methylation reaction is substantially complete.

3. The process for making tetramethyl lead which comprises initiating at a temperature of from about 50° C. to about 70° C. the reaction of a sodium lead alloy and an alkylating agent which consists of a methyl halide in which the halogen has an atomic number in the range of 17 to 53 in the presence of from about 0.1% to about 0.6% by weight of the sodium lead alloy of aluminum in the form of an aluminum alloy which contains at least about 70% by weight of aluminum, and from about 0.8 to about 2 parts of elemental bromine per part of aluminum, then heating the reacting mixture to a temperature of from about 90° C. to about 120° C. and maintaining the mixture at the latter temperature until the methylation reaction is substantially complete.

4. The process for making tetramethyl lead which comprises initiating at a temperature of from about 50° C. to about 70° C. the reaction of a sodium lead alloy and an alkylating agent which consists of methyl chloride in the presence of from about 0.1% to about 0.6% by weight of the sodium lead alloy of aluminum in the form of an aluminum alloy which contains at least about 70% by weight of aluminum and the rest consists essentially of at least one metal from the group consisting of Mn, Si, Cu, Mg, Pb, Fe, Ni, Cr, Zn and Ti, and from about 0.8 to about 2 parts of elemental bromine per part of aluminum, then heating the reacting mixture to a temperature of from about 90° C. to about 120° C. and maintaining the mixture at the latter temperature until the methylation reaction is substantially complete.

5. The process for making tetramethyl lead which comprises mixing at a temperature below about 50° C. a sodium lead alloy, at least about 0.25 mole per mole of sodium of an alkylating agent which consists of a methyl halide in which the halogen has an atomic number in the range of 17 to 53, from about 0.05% to about 1% by weight of the sodium lead alloy of aluminum in the form of a member of the group consisting of aluminum metal and aluminum alloys which contain at least about 70% by weight of aluminum, and from about 0.3 to about 3 parts of elemental bromine per part of aluminum, gradually heating the mixture to initiate the methylation reaction and then to a temperature of from about 90° C. to about 130° C. and maintaining it at the latter temperature until the methylation reaction is substantially complete while gradually adding such quantities of said methyl halide as may be required to provide a total of at least one mole thereof for each mole of sodium.

6. The process for making tetramethyl lead which comprises mixing at a temperature below about 50° C. a sodium lead alloy, at least about 0.25 mole per mole of sodium of an alkylating agent which consists of a methyl halide in which the halogen has an atomic number in the range of 17 to 53, from about 0.1% to about 0.6% by weight of the sodium lead alloy of aluminum in the form of an aluminum alloy which contains at least about 70% by weight of aluminum, and from about 0.8 to about 2 parts of elemental bromine per part of aluminum, gradually heating the mixture to initiate the methylation reaction and then to a temperature of from about 90° C. to about 130° C. and maintaining it at the latter temperature until the methylation reaction is substantially complete while gradually adding such quantities of said methyl halide as may be required to provide a total of from about 1:1 to about 20 moles thereof for each mole of sodium.

7. The process for making tetramethyl lead which comprises mixing at a temperature below about 50° C. a sodium lead alloy, at least about 0.25 mole per mole of sodium of an alkylating agent which consists of methyl chloride, from about 0.1% to about 0.6% by weight of the sodium lead alloy of aluminum in the form of an aluminum alloy which contains at least about 70% by weight of aluminum and the rest consists essentially of at least one metal from the group consisting of Mn, Si, Cu, Mg, Pb, Fe, Ni, Cr, Zn and Ti, and from about 0.8 to about 2 parts of elemental bromine per part of aluminum, gradually heating the mixture to initiate the methylation reaction and then to a temperature of from about 90° C. to about 120° C. and maintaining it at the latter temperature until the methylation reaction is substantially complete while gradually adding such quantities of methyl chloride as may be required to provide a total of from about 1.1 to about 5 moles thereof for each mole of sodium.

8. The process for making tetramethyl lead which comprises mixing at a temperature below about 50° C. a sodium lead alloy, at least about 1 mole per mole of sodium of an alkylating agent which consists of a methyl halide in which the halogen has an atomic number in the range of 17 to 53, from about 0.05% to about 1% by weight of the sodium lead alloy of aluminum in the form of a member of the group consisting of aluminum metal and aluminum alloys which contain at least about 70% by weight of aluminum, and from about 0.3 to about 3 parts of elemental bromine per part of aluminum, gradually heating the mixture to initiate the methylation reaction and then to a temperature of from about 90° C. to about 130° C. and maintaining it at the latter temperature until the methylation reaction is substantially complete.

9. The process for making tetramethyl lead which comprises mixing at a temperature below about 50° C. a sodium lead alloy, from about 1.1 to about 20 moles per mole of sodium of an alkylating agent which consists of a methyl halide in which the halogen has an atomic number in the range of 17 to 53, from about 0.05% to about 1% by weight of the sodium lead alloy of aluminum in the form of an aluminum alloy which contains at least about 70% by weight of aluminum, and from about 0.8 to about 2 parts of elemental bromine per part of aluminum, gradually heating the mixture to initiate the methylation reaction and then to a temperature of from about 90° C. to about 130° C. and maintaining it at the latter temperature until the methylation reaction is substantially complete.

10. The process for making tetramethyl lead which comprises mixing at a temperature below about 50° C. a sodium lead alloy, from about 1.1 to about 5 moles per mole of sodium of an alkylating agent which consists of methyl chloride, from about 0.1% to about 1% by weight of the sodium lead alloy of aluminum in the form of an aluminum alloy which contains at least about 70% by weight of aluminum and the rest consists essentially of at least one metal from the group consisting of Mn, Si, Cu, Mg, Pb, Fe, Ni, Cr, Zn and Ti, and from about 0.8 to about 2 parts of elemental bromine per part of aluminum, gradually heating the mixture to initiate the methylation reaction and then to a temperature of from about 90° C. to about 120° C. and maintaining it at the latter temperature until the methylation reaction is substantially complete.

References Cited in the file of this patent
UNITED STATES PATENTS

| | | |
|---|---|---|
| 1,611,695 | Sullivan et al. | Dec. 21, 1926 |
| 1,639,947 | Kraus et al. | Aug. 23, 1927 |
| 1,697,245 | Kraus et al. | Jan. 1, 1929 |
| 2,270,109 | Calingaert et al. | Jan. 13, 1942 |
| 2,848,471 | Pagliarini | Aug. 19, 1958 |